No. 664,276. Patented Dec. 18, 1900.
F. E. KING.
MEASURING INSTRUMENT.
(Application filed Nov. 8, 1898.)
(No Model.) 2 Sheets—Sheet 1.
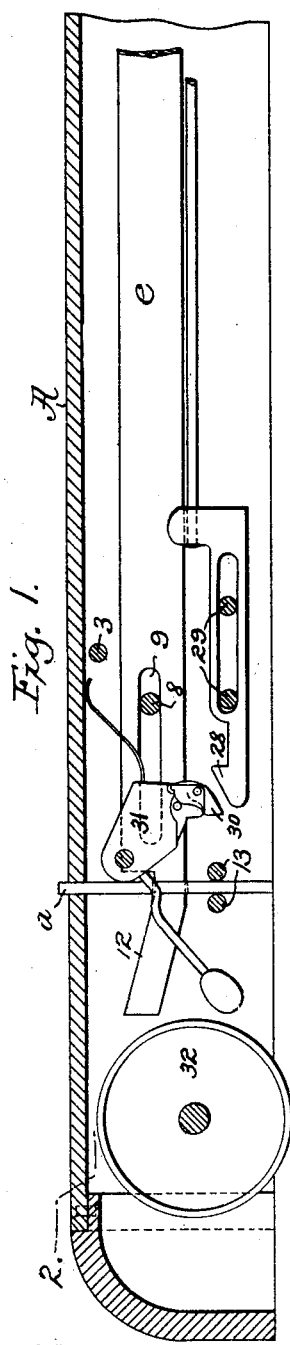
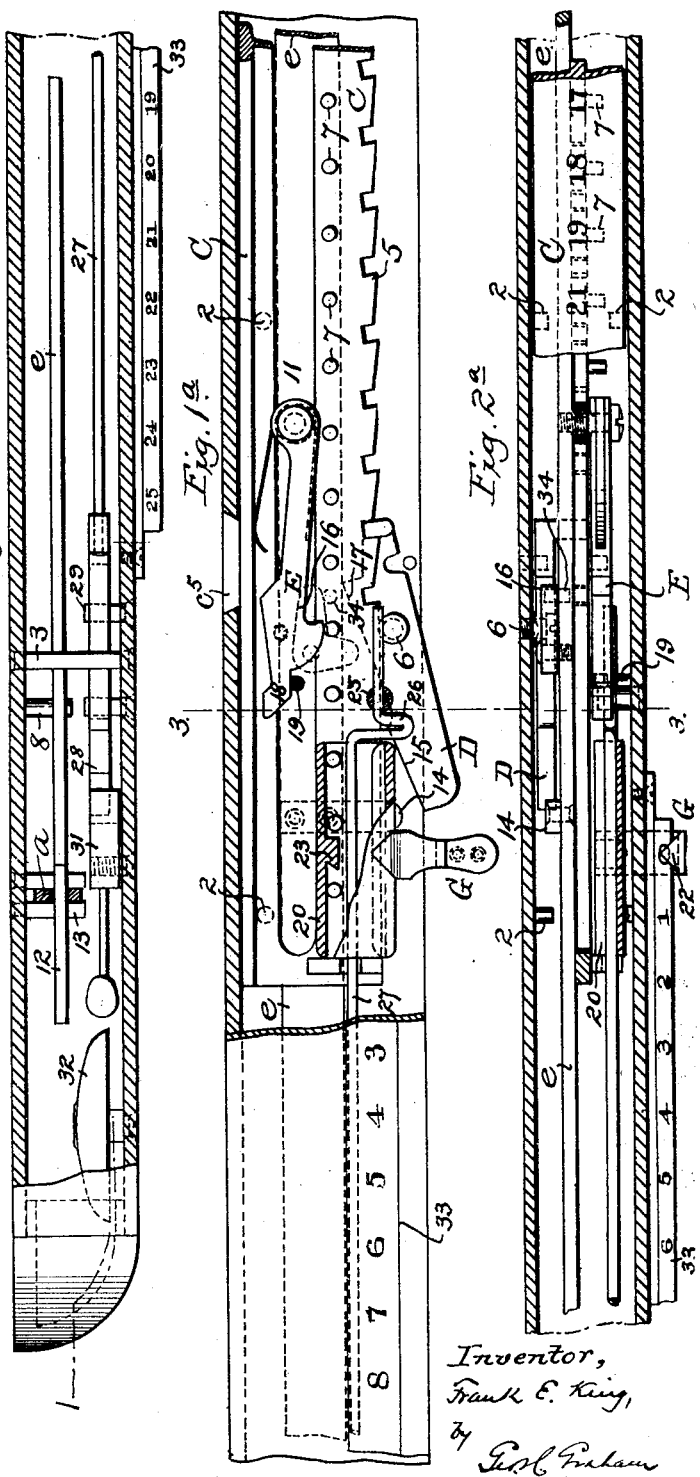
Witnesses:
Inventor,
Frank E. King,
by Geo. C. Graham
Atty.
THE NORRIS PETERS CO., PHOTO-LITHO., WASHINGTON, D. C.

No. 664,276. Patented Dec. 18, 1900.
F. E. KING.
MEASURING INSTRUMENT.
(Application filed Nov. 8, 1898.)
(No Model.) 2 Sheets—Sheet 2.
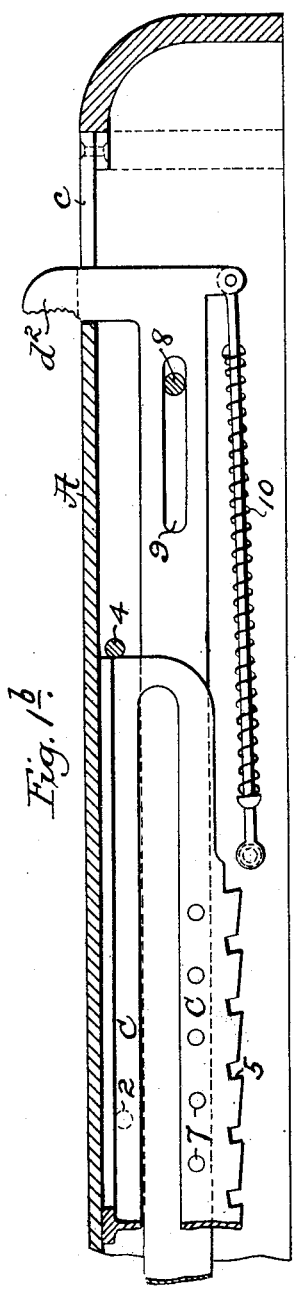
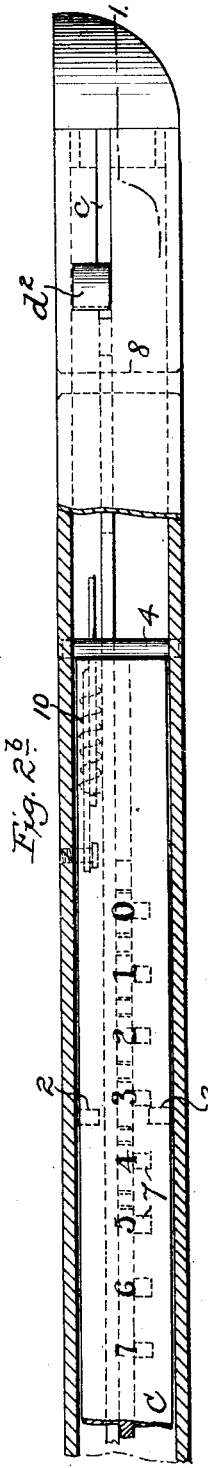
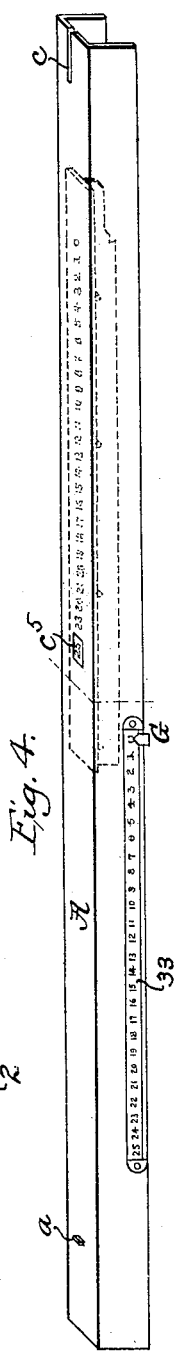
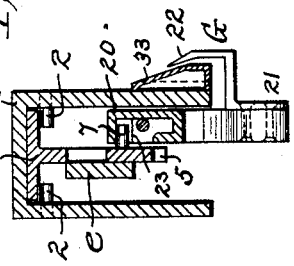
WITNESSES
W. H. Graham
C. Crotty
INVENTOR
Frank E. King
BY
Geo. C. Graham
ATTORNEY

UNITED STATES PATENT OFFICE.

FRANK E. KING, OF LAWRENCE, MASSACHUSETTS, ASSIGNOR TO THE LAMSON STORE EQUIPMENT COMPANY, OF BOSTON, MASSACHUSETTS.

MEASURING INSTRUMENT.

SPECIFICATION forming part of Letters Patent No. 664,276, dated December 18, 1900.

Application filed November 8, 1898. Serial No. 695,910. (No model.)

*To all whom it may concern:*

Be it known that I, FRANK E. KING, a citizen of the United States of America, residing at Lawrence, county of Essex, State of Massachusetts, have invented certain new and useful Improvements in Measuring Instruments, of which the following is a specification.

This invention relates generally to measuring devices, and more particularly to those capable of taking the place of the usual yardstick in the measurement of goods; and it has for its object to generally improve and simplify the construction and operation of such devices to the end that certainty and accuracy of operation are insured.

In order to aid a more ready understanding of the improvement, a detailed description thereof will now be given, reference being had to the accompanying drawings, in which—

Figures 1, 1$^a$, and 1$^b$ are together a vertical sectional elevation thereof, taken on the lines 1. Figs. 2, 2$^a$, and 2$^b$ are together a horizontal sectional elevation taken on the lines 2. Fig. 3 is a cross-section on the line 3 of Figs. 1$^a$ and 2$^a$. Fig. 4 is a perspective view of the device, the curved ends being omitted.

The mechanism of the instrument is contained within and supported by a long and preferably rectangular inclosing case A, of about or a little more than a yard by measurement in length, intended to be mounted along the edge of a sales-counter for use in measuring goods. Along the upper surface of the inclosing case it may bear a series of fraction-marks representing fractions of any unit of measurement—for instance, those of a yard. In connection with these fraction-marks and the yard measurement the instrument may have a zero point or key $a$ arranged at the left-hand end thereof, and at the right-hand end the top surface of the inclosing case is provided with a slotted opening $c$, through which projects an operating thumb-piece $d^2$, capable of longitudinal reciprocation along the inclosing case, its extreme limit of movement to the right measuring one yard distance from the zero-key $a$. About midway of the length of the inclosing case, on its upper surface, there is formed an opening $c^5$, through which indications on an underlying yard-indicating slide may be exposed to view. The front of the inclosing case, near its bottom edge, is provided with a horizontally-arranged index-plate bearing numerals from "0" and "1" to "25" within the capacity of the instrument to measure yards or some other agreed unit of measurement.

The interior of the instrument contains a yard-indicating device consisting of a slide C, bearing on its upper surface numerals "0" and "1" to "25," arranged to be exposed in succession through the opening $c^5$ in the upper face of the inclosing case. This slide is of T shape, providing a pair of horizontal flanges which rest upon guide-pins 2, projecting inwardly from the inner walls of the front and rear sides of the inclosing case and serving to support the upper surface of said slide against the under side of the top plate of the case and permit it to freely move longitudinally within said case, between the back and front stops 3 4, without danger of any accumulation of dirt obstructing such free movement. The lower edge of this indicating-slide is formed with a series of teeth 5, arranged to be engaged by a detent D, pivoted at 6 to the rear wall of the case. The slide is also provided on its front side with a series of short pins 7 in the nature of rack-teeth, with which an operating-pawl E may engage. The operating-pawl is pivotally connected to a reciprocating operating-bar $e$, extending longitudinally of the instrument, immediately behind the indicating-slide C, and guided in its reciprocations by transverse pins 8, passing through slots 9, located near the two ends of the bar. To the right-hand end of the bar the thumb-piece $d^2$ is secured, projecting upward through the opening $c$ in the case. The bar is moved to the right through said thumb-piece against the pull of a suitable spring 10, connected to its right-hand end, which after the thumb-piece is released serves to return the bar to the left. The heel of the operating-pawl E projects through a long opening 11 in the indicating-slide C, so that it may lie upon the front of said slide to engage with the rack-teeth 7 thereon. The left-hand end of the operating-bar, Fig. 1, terminates in an inclined portion 12, passing through a vertical slot in the zero-key $a$, which when the bar is reciprocated will be moved vertically to project a distance above the top surface of the case in the act of measuring the goods and to retire as soon as each measuring operation is completed. This zero-key is guided by the walls of the slot in the case and by a pair of transverse pins 13.

The operating-bar $e$ carries a downward projection 14, (see Fig. 1$^a$,) arranged upon the completion of each operating movement of the pawl E to the right to engage an inclined portion 15 of the detent D and by rocking it insure it engaging with the teeth 5 at the completion of each step movement of the indicating-slide C. This bar $e$ also carries on its rear side a pivotally-mounted rock-arm 16, which on the commencement of the movement of the bar to the right bears against another incline 17 of said detent D and forces it out of engagement with the teeth 5 of the slide C, so as to free the latter for a step movement. On the return movement of the operating-bar $e$ to the left the rock-arm 16 passes idly against the abrupt end of the detent-incline 15, and is thereby rocked upwardly without having moved the detent, and just as the bar reaches the limit of its return movement the rock-arm 16 strikes a fixed pin 34, which positively rocks the arm back to its original position ready to bear against the detent-incline, as before.

The operating-pawl E is spring-pressed toward the rack-teeth 7 to insure engagement therewith when the operating-bar is moved and is provided with an inclined nosepiece 18 to meet and ride up over a pin 19, projecting inwardly from the front side of the inclosing case, so as to lift the operating-pawl from engagement with the pins of the slide C.

The indicating-slide C is shown at the limit of its movement at the right, showing "25" through the top opening $c^5$, having completed a twenty-five yard measurement. In the normal starting position (not shown) of this slide C its left-hand end abuts against the back stop 3, showing "0" through the said top opening. In the measuring operation the operating-bar through its thumb-piece $d^2$ is moved to the right, thereby drawing the nose of the operating-pawl from the pin 19 and allowing the spring to force the pawl into engagement with the adjacent pin-tooth 7 of the slide, so that a continued movement of said operating bar and pawl will carry the slide one step to the right, so that its indication "1" will show through the top opening $c^5$, indicating one-yard measurement. On the return movement of the operating-bar to the left the operating-pawl will be raised from engagement with the pin-tooth ready to be again lowered and engaged with the succeeding pin-tooth of said slide when said bar is again operated. The operating-bar will be reciprocated each time a yard is measured, each time moving the slide a step to the right until the desired indication is seen through the top opening, showing that that number of yards have been measured by the operator.

In order to set the instrument to indicate a predetermined quantity of goods and then stop, it is provided with a setting device G capable of movement by the operator to a position indicating, in the first instance, the desired number of yards to be measured. This setting device consists of a freely-movable slide 20, having a handpiece 21, by which it may be moved, and an index-pointer 22, arranged to overlie and coact with the index face-plate 33 on the front of the inclosing case. This setting-slide is arranged to hang on the pin-teeth of the indicating-slide C and is provided with a downwardly-projecting tooth 23, entering between a pair of pin-teeth, as seen in Fig. 1$^a$, so that in the movement of the indicating-slide to the right said setting-slide will be carried with it. Assuming the indicating-slide C to be at its normal or extreme left-hand position and it is desired to start the measurement of, say, five yards of goods, the setting-slide will be raised to remove its tooth from engagement with the pin-teeth of the indicating-slide and moved longitudinally until its pointer 22 rests over "5" on the index face-plate, when it is released, so that its tooth 23 enters between a pair of said pin-teeth. The operating-bar is then reciprocated five times and until the indication "5" is seen through the top opening $c^5$, at which time the said pointer, having been moved step by step from its set position, arrives at the zero on said face-plate, whereupon the setting-slide may meet some limiting-abutment and prevent further movement of the instrument. The limiting-stop in the present instance, while, in fact, provided by a stop 25, projecting inwardly from the front side of the case, is preferably provided by a projection 26 on a portion of the bell or alarm sounding rod 27, which is interposed between the setting-slide and said stop 25. This rod 27 is guided at one end by passing through said stop and at the left-hand end (see Fig. 1) terminates in a hook-shaped piece 28, that is slotted to be guided by two pins 29. The hook of this piece engages a spring-pressed detent 30 on the bell-hammer lever 31, coacting with the bell 32, so that when the setting-slide nearly reaches the limit of its right-hand movement and bears against said projection of the rod 27, it moves said rod and its hooked piece so as to trip the bell-hammer lever under the tension of its spring and sound the bell.

What is claimed is—

1. In a measuring instrument, the combination of a step-by-step movable indicating-slide, a reciprocated operating-pawl for the slide, and an automatically-movable detent mounted independent of the pawl preventing accidental movement of said slide, as set forth.

2. In a measuring instrument, the combination of a step-by-step movable indicating-slide, a longitudinally-reciprocated operating-pawl for the slide, and a fixed pin for disengaging the pawl from the slide at the end of each step movement thereof, as set forth.

3. In a measuring instrument, the combination of a step-by-step movable indicating-slide, a longitudinally-reciprocated operating-pawl for the slide, a movable detent engaging the slide, and means for releasing said detent at the commencement of each operating movement of the pawl, as set forth.

4. In a measuring instrument, the combination of a step-by-step movable indicating-slide, a reciprocated operating-pawl for the slide, a movable detent engaging the slide and means carried with the pawl for insuring engagement of the detent at the end of each of its operating movements as described.

5. In a measuring instrument, the combination of a step-by-step movable indicating-slide, a reciprocated operating-pawl therefor, a movable detent engaging the slide, means carried with the pawl for disengaging the detent and other means also carried with the pawl for insuring the reëngagement of said detent at the end of the operating movement of the pawl, as set forth.

6. The combination of the inclosing case, a T-shaped step-by-step movable indicating-slide contained thereby, and oppositely-projecting pins carried by the case and forming supporting guide-pins for the slide, as set forth.

7. The combination, of a step-by-step movable indicating-slide, means for moving said slide, and a longitudinally-adjustable setting device movable with and independent of the slide, as set forth.

8. The combination of a step-by-step movable indicating-slide, means for moving said slide, a longitudinally-adjustable setting device detachably connected to the slide and movable therewith, a stop for limiting the movement of said device and slide, as set forth.

9. The combination of a step-by-step movable indicating-slide having horizontally-projecting rack-teeth and a reciprocated operating-pawl engaging said teeth, as set forth.

10. The combination of a step-by-step movable indicating-slide having horizontally-projecting rack-teeth and a toothed lower edge, a reciprocated operating-pawl engaging said rack-teeth and a detent engaging the toothed edge of said slide, as set forth.

11. The combination of the step-by-step movable indicating-slide, means for operating the slide, a setting device movable with and independent of the slide, and an alarm mechanism operated by the setting device, as set forth.

12. In a measuring instrument, the combination of a step-by-step movable indicating-slide, a reciprocated operating-pawl for the slide, a movable detent engaging the slide, a rock-arm engaging the detent to release it at the commencement of movement of the pawl and a pin to insure the resetting of the rock-arm on its return movement, as described.

13. In a measuring instrument, the combination of a movable slide having laterally projecting rack-teeth, an operating-pawl engaging said teeth, and an independently-movable setting device also engaging said teeth, as described.

In witness whereof I have hereunto set my name in the presence of two witnesses.

FRANK E. KING.

Witnesses:
  NEWMAN W. STORER,
  JOSEPH H. LOVETT.